United States Patent
Kim et al.

(10) Patent No.: US 7,545,775 B2
(45) Date of Patent: Jun. 9, 2009

(54) METHOD FOR PERFORMING A HANDOFF IN AN ALL-IP NETWORK

(75) Inventors: Jong-Oh Kim, Seoul (KR); Jae-Am Choi, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 981 days.

(21) Appl. No.: 10/331,275

(22) Filed: Dec. 30, 2002

(65) Prior Publication Data

US 2003/0153314 A1    Aug. 14, 2003

(30) Foreign Application Priority Data

Dec. 29, 2001    (KR)    ........................ 10-2001-0088405

(51) Int. Cl.
*H04W 4/00* (2006.01)
(52) U.S. Cl. .................. 370/331; 455/439; 455/442
(58) Field of Classification Search ............. 370/331; 455/436, 439, 442
See application file for complete search history.

(56) References Cited

U.S. PATENT DOCUMENTS

| | | | |
|---|---|---|---|
| 6,708,031 B2 * | 3/2004 | Purnadi et al. ............. | 455/436 |
| 6,788,660 B1 * | 9/2004 | Agrawal et al. ............. | 370/331 |
| 6,845,095 B2 * | 1/2005 | Krishnarajah et al. ....... | 370/349 |
| 6,879,566 B1 * | 4/2005 | Raivio et al. ............. | 370/310.1 |
| 6,889,050 B1 * | 5/2005 | Willars et al. ............. | 455/452.2 |
| 6,907,245 B2 * | 6/2005 | Ohlsson et al. ............. | 455/442 |
| 6,941,132 B2 * | 9/2005 | Van Lieshout et al. ....... | 455/418 |
| 7,035,236 B2 * | 4/2006 | Agrawal et al. ............. | 370/331 |
| 7,039,028 B2 * | 5/2006 | Chen et al. ................. | 370/331 |
| 7,099,326 B2 * | 8/2006 | Flinck et al. ................ | 370/392 |
| 7,263,081 B2 * | 8/2007 | Ishikawa ..................... | 370/331 |
| 7,292,554 B2 * | 11/2007 | Choi et al. .................. | 370/335 |
| 2003/0016655 A1 * | 1/2003 | Gwon ......................... | 370/352 |
| 2003/0026241 A1 * | 2/2003 | Ono et al. .................... | 370/349 |
| 2004/0176091 A1 * | 9/2004 | Bajko et al. ................ | 455/435.1 |

FOREIGN PATENT DOCUMENTS

WO    WO 02091786    * 11/2002

* cited by examiner

*Primary Examiner*—Hassan Kizou
*Assistant Examiner*—Brian T O'Connor
(74) *Attorney, Agent, or Firm*—The Farrell Law Firm, LLP (57) ABSTRACT

A method for performing a handoff in an ALL-IP network. The Mobile Station (MS) transmits measurement information to a new Base Transceiver System (BTS) and the Radio Network Controller (RNC) to start a handoff, the RNC requests the new BTS to set up a radio link with the MS. When the radio link is set up between the MS and the new BTS, the RNC requests to delete header information of the MS stored in an old BTS. The MS transmits a message including traffic header information to the new BTS, the new BTS transmits a binding update message to the MS. Then the MS transmits only the voice frame excluding the traffic header information to the new BTS.

1 Claim, 7 Drawing Sheets

METHOD FOR PERFORMING A HANDOFF IN AN ALL-IP NETWORK

PRIORITY

This application claims priority to an application entitled "Method for Performing Handoff in an ALL-IP Network" filed in the Korean Industrial Property Office on Dec. 29, 2001 and assigned Serial No. 2001-88405, the contents of which are hereby incorporated by reference.

BACKGROUND OF THE INVENTION

1. Field of the Invention

The present invention relates generally to a handoff method in a mobile communication system supporting an ALL-IP network, and in particular, to a handoff method for removing an overhead of an ALL-IP-based voice transmission frame.

2. Description of the Related Art

Recently, in order to solve an inefficiency problem of radio resources during circuit switching in an IMT-2000 (International Mobile Telecommunication-2000) network supporting both a packet network and a circuit network, many attempts have been made to integrate next generation mobile communication networks into a packet-based IP (Internet Protocol) network, called an ALL-IP network, by major next generation mobile communication standardization organizations including 3GPP ($3^{rd}$ Generation Partnership Project) and 3GPP2 ($3^{rd}$ Generation Partnership Project 2). The ALL-IP network has an open-type data network structure, so it can effectively support future IP-based services and enable integrated, low-cost maintenance using IP. However, the ALL-IP network wastes bandwidths of a radio link due to an excessive traffic overhead occurring in the radio link. Specifically, in a voice service, the most fundamental service of the mobile communication system, an excessive overhead is generated in order to transmit a small frame.

Figure 1:
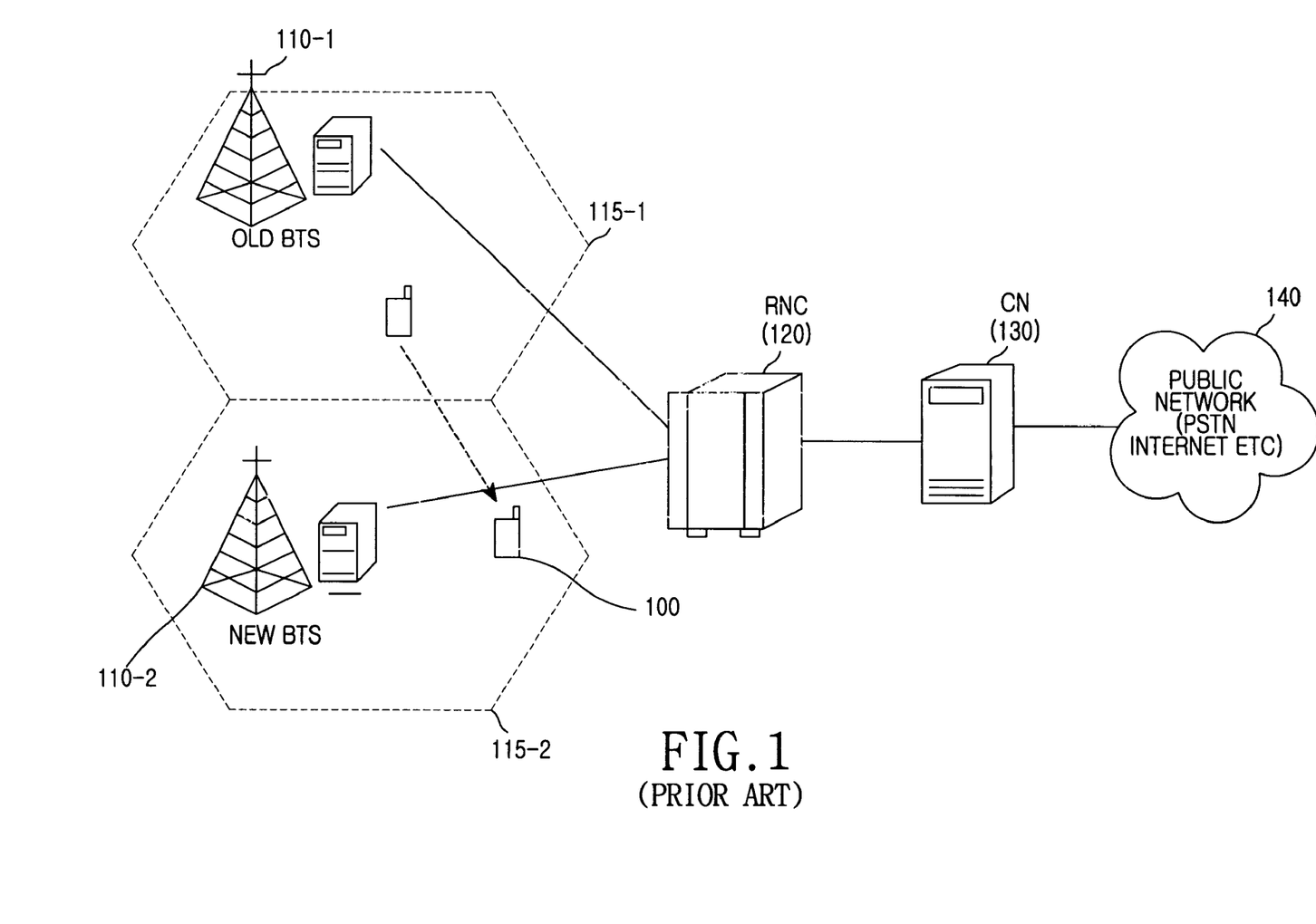
FIG. 1 illustrates a structure of an ALL-IP network based on a third generation mobile communication system.

FIG. 1 illustrates a structure of an ALL-IP network based on a third generation mobile communication system. Referring to FIG. 1, an ALL-IP network includes a mobile station (MS) 100, base transceiver systems (BTSs) 110-1 and 110-2, a radio network controller (RNC, also known as BSC) 120, a core network (CN) 130, and a public network (including PSTN (Public Switched Telephone Network) and Internet) 140. The BTSs 110-1 and 110-2, and the RNC 120 support a radio access service. The CN 130 connects the RNC 120 to the public network 140.

In the ALL-IP network, a 40-bit overhead including an RTP (Real Time Protocol) header, a UDP (User Datagram Protocol) header and an IP header is generated on a radio link between the MS 100 and the BTS 110. The 40-bit overhead represents an overhead excluding a channel overhead in a physical layer. Meanwhile, in order to perform routing and other various functions in the ALL-IP network, a voice frame, while it passes through an RTP stack and a UDP stack, adds an RTP header and a UDP header thereto. Further, an additional overhead may be optionally added to the voice frame. As a result, an actual size of the voice frame on a radio link becomes less than 50% of the whole traffic, causing a waste of bandwidths of the radio link. Such a phenomenon becomes more severe when a soft handoff in which the MS 100 occupies two or more radio channels occurs between the BTSs.

Figure 2:
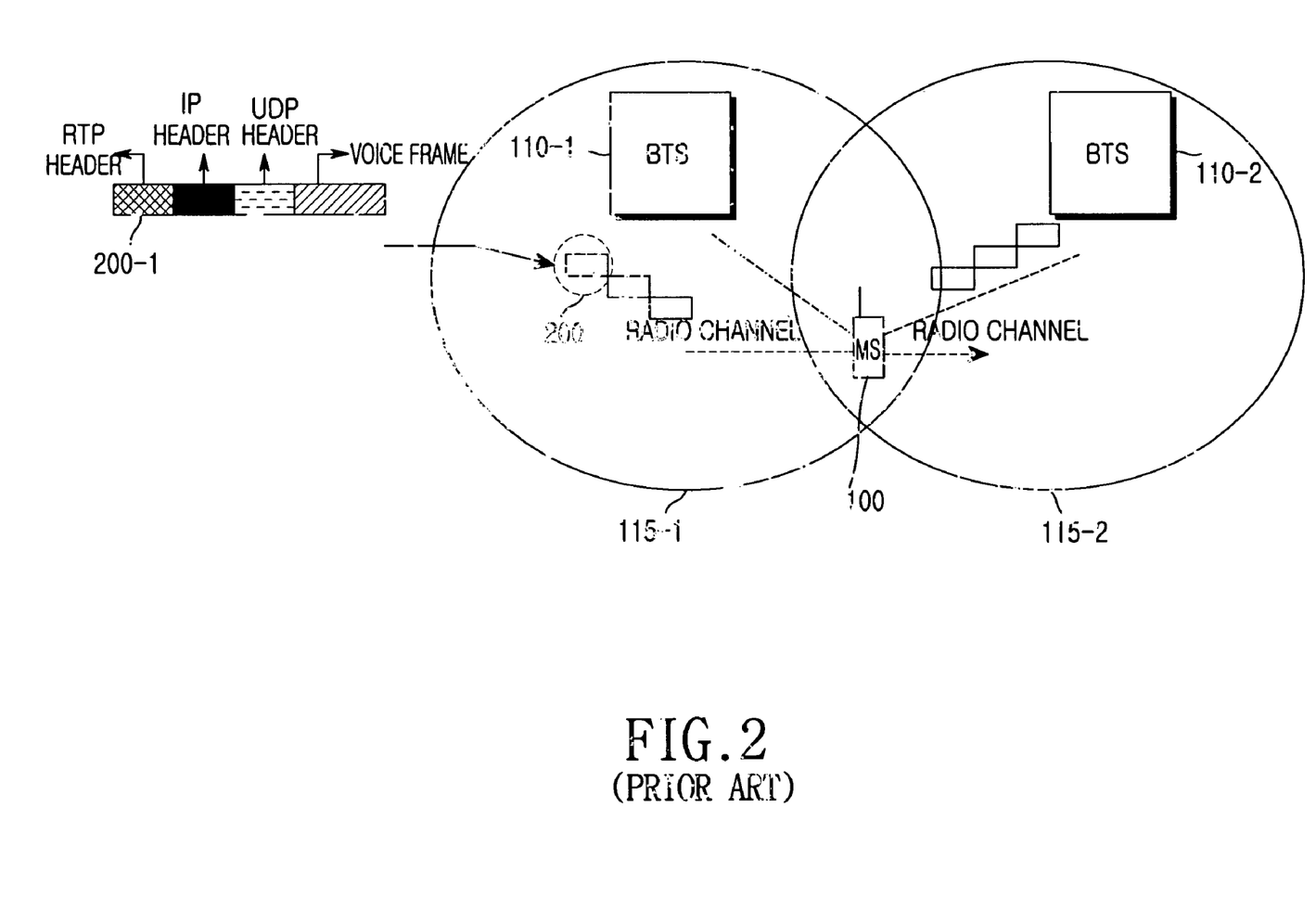
FIG. 2 illustrates a soft handoff procedure in which an MS occupies two channels.

FIG. 2 illustrates a soft handoff procedure in which an MS occupies 2 channels. Referring to FIG. 2, a voice frame transmitted through downlink (or forward) and uplink (or reverse) radio channels between the MS 100 and the two BTSs 110-1 and 110-2 also includes a 40-bit overhead for voice channel transmission.

SUMMARY OF THE INVENTION

It is, therefore, an object of the present invention to provide a handoff method for removing an overhead generated in voice traffic on a radio link between an MS and a BTS in an ALL-IP network.

According to an aspect of the present invention, there is provided a method for performing a handoff in an ALL-IP network including at least one MS (Mobile Station) for transmitting a signaling frame having a header and a voice frame to an old BTS (Base Transceiver System), which includes a header information storage for storing overhead information for the MS in association with a unique code of the MS, and an RNC (Radio Network Controller). The MS transmits measurement information to a new BTS and the RNC to start a handoff. Upon receipt of the measurement information, the RNC requests the new BTS to set up a radio link with the MS that has transmitted the measurement information. When the radio link is set up between the MS and the new BTS, the RNC deletes header information for the MS, stored in the header information storage of the old BTS. The MS transmits a message including traffic overhead information to the new BTS. Upon receipt of the message including the traffic header information, the new BTS transmits a binding update message to the MS.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings in which like parts or elements are denoted by like reference numerals throughout the several views.

In the following description, the term "old BTS" indicates a BTS 110-1 of a cell 115-1 where an MS 100 was originally located, and the term "new BTS" indicates a BTS 110-2 with which the MS 100 will newly communicate due to a handoff.

The embodiment of the present invention uses a header information storage included in a BTS in order to remove an overhead generated during a handoff in an ALL-IP network.

Figure 3:
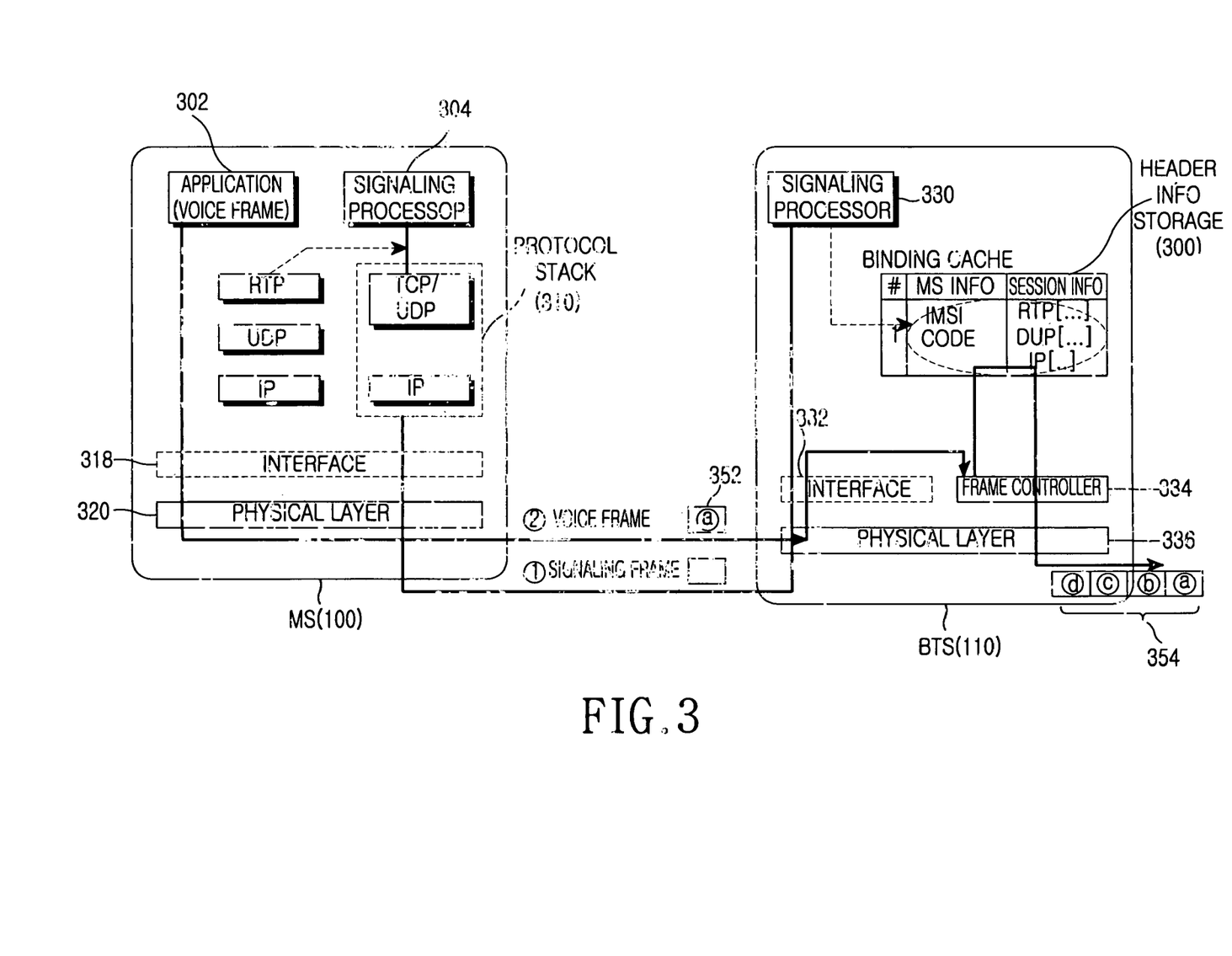
FIG. 3 illustrates a BTS with a header information storage and an MS connected to the BTS according to a preferred embodiment of the present invention.

FIG. 3 illustrates a BTS with a header information storage and an MS connected to the BTS according to a preferred embodiment of the present invention. A structure and operation of transmitting a voice frame according to an embodiment of the present invention will be described with reference to FIG. 3.

Referring to FIG. 3, an MS 100 includes an application 302, a signaling processor 304, a protocol stack 310, and an interface 318. The application 302 converts voice input by a user into voice data and outputs a voice frame with a specific length. The signaling processor 304 receives a telephone number or an IP address and generates a header generation command for generating corresponding header information. The protocol stack 310 generates header information in response to the header generation command provided from the signaling processor 304. A voice frame 352 and a signaling frame with an overhead such as the RTP header and the UDP header, generated respectively by the application 302 and the signaling processor 304 of the MS 100, are transmitted to the BTS 110 through different channels. The voice traffic and the signal traffic may be transmitted through a traffic channel and a traffic control channel, respectively.

The BTS 110 includes a signaling processor 330, a header information storage 300, an interface 332, and a frame controller (of frame handler) 334. The interface 332 interfaces signals transmitted and received to/from at least one MS 100. The frame controller 334 controls frames transmitted and received through the interface 332. The header information storage 300 stores header information received from the MS 100, in association with the corresponding MS. The BTS 110 uses a code for a reverse link in order to identify the header information of the MS 100. That is, the BTS 110 detects a unique code for the MS 100 connected thereto and stores the detected code. Further, the BTS 110 detects header information received from the MS 100 and stores the detected header information in association with the unique code of the MS 100 that has transmitted the header information.

Upon receipt of a call setup request from a user, the MS 100 generates a telephone number or an IP address input by the user and provides the generated telephone number or IP address to the signaling processor 304. Upon receiving the telephone number or IP address, the signaling processor 304 provides the protocol stack 310 with a header generation command based on the received telephone number or IP address. The protocol stack 310 generates an RTP header, a UDP header, and an IP header in response to the header generation command, and provides them to the interface 318 and a physical layer 320. The physical layer 320 carries the header information on the signaling frame, spreads the signaling frame with a user identification code, modulates the spread signaling frame into a radio signal, and transmits the radio signal to the BTS 110 through a packet control channel. After transmission of the signaling frame, the MS 100 forms a communication path through call negotiation with the BTS 110, encodes user's voice into voice data, and provides the voice data to the physical layer 320 in a voice frame unit. The physical layer 320 modulates the voice frame into a radio signal and transmits the radio signal to the BTS 110 through the traffic channel.

The BTS 110 receives the signaling frame transmitted by the MS 100. The signaling frame is provided to the signaling processor 330 and the frame controller 334 through a physical layer 336 and the interface 332. The signal input to the signaling processor 330 is a demodulated signal of the signaling frame received in the form of the radio signal, and the signal input to the frame controller 334 is a unique code for the MS, detected from the received signaling frame. The frame controller 334 receives the unique code for the MS and allows the signaling processor 330 to control an operation of processing the signaling frame. The signaling processor 330, under the control of the frame controller 334, detects headers from the received signaling frame and stores the detected headers in the header information storage 300.

After storing the headers from the MS 100 in the header information storage 300, the frame controller 334 detects an MS identification code for the voice frame received from the MS 100 and searches the header information storage 300 for the header information corresponding to the detected code. Upon detecting the header information, the frame controller 334 adds the detected header information to the voice frame and transmits it to the RNC 120. By doing so, the header for the voice frame of the MS 100 is added to the voice frame received through the header information storage 300 of the BTS 110 and transmitted to a core network. Consequently, it is possible to transmit only the pure voice frame through a voice transmission channel on the radio link between the MS 100 and the BTS 110.

The signal transmission from the BTS 110 to the MS 100 is performed as follows. The BTS 110 receives an IP-based transmission frame through the RNC 120. The received transmission frame is comprised of a voice frame and a header added to the voice frame. The BTS 110 separates the header and the voice frame from the transmission frame, and searches the header information storage 300 for a code corresponding to the header information. Upon detecting the corresponding code, the BTS 110 transmits the voice frame corresponding to the detected code to the MS 100 through the voice frame transmission channel. Here, it is not necessary to transmit the separated header. However, when it is necessary to indicate caller information, the BTS 110 can carry the header on the signaling frame and transmits the signaling frame to the MS 100 during initial destination call setup before transmitting the voice frame.

To be specific, upon receiving a transmission frame comprised of the header and the voice frame, the frame controller 334 determines whether the header information for the MS 100 that has transmitted the transmission frame is stored in the header information storage 300. If the header information for the MS 100 is stored in the header information storage 300, the frame controller 334 controls the signaling processor 330 to separate the header and the voice frame from the transmission frame. The separated header is used only for identifying a destination MS, and the voice frame is transmitted to the MS 100. The MS 100 receives the voice frame transmitted by the BTS 110 and converts the received voice frame into voice.

Figure 4:
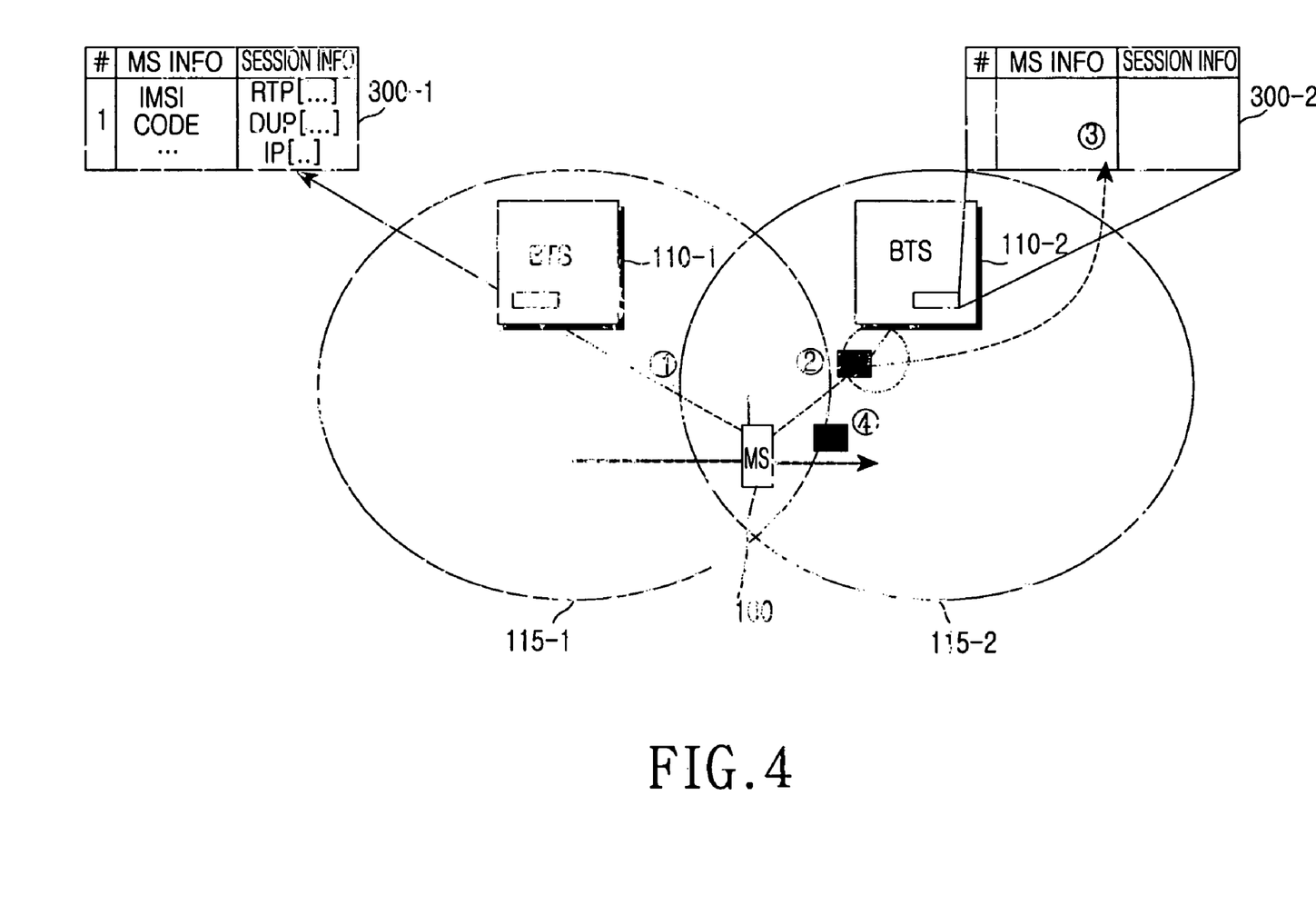
FIG. 4 illustrates a soft handoff procedure in BTSs each including a header information storage in an ALL-IP network according to a preferred embodiment of the present invention.

FIG. 4 illustrates a soft handoff procedure in the BTSs each including the header information storage in the ALL-IP network. Referring to FIG. 4, in the ALL-IP network comprised of the BTS 110 including the header information storage 300, the voice frame and the header are separately transmitted between the MS 100 and the BTS 110, thereby preventing addition of the overhead to the voice frame. A soft handoff method in the ALL-IP network where an overhead is not generated will now be described with reference to FIGS. 3 and 4.

A BTS 110-2 within a new cell 115-2 to which the MS 100 is handed off temporarily, stores traffic overhead information (RTP/DUP/IP header) for the MS 100 in the header information storage 300 through signaling. The MS 100 can transmit the overhead information to the new BTS 110-2 during a handoff signaling process because it maintains the traffic-related overhead information needed to attempt a call with the new BTS 110-2. The old BTS 110-1 is requested to release the overhead information for the MS 100, stored therein, through the signaling process, and then it deletes the header information for the MS 100 from a header information storage 300-1. Thus, the call with the old BTS 110-1 is terminated.

Figure 5:
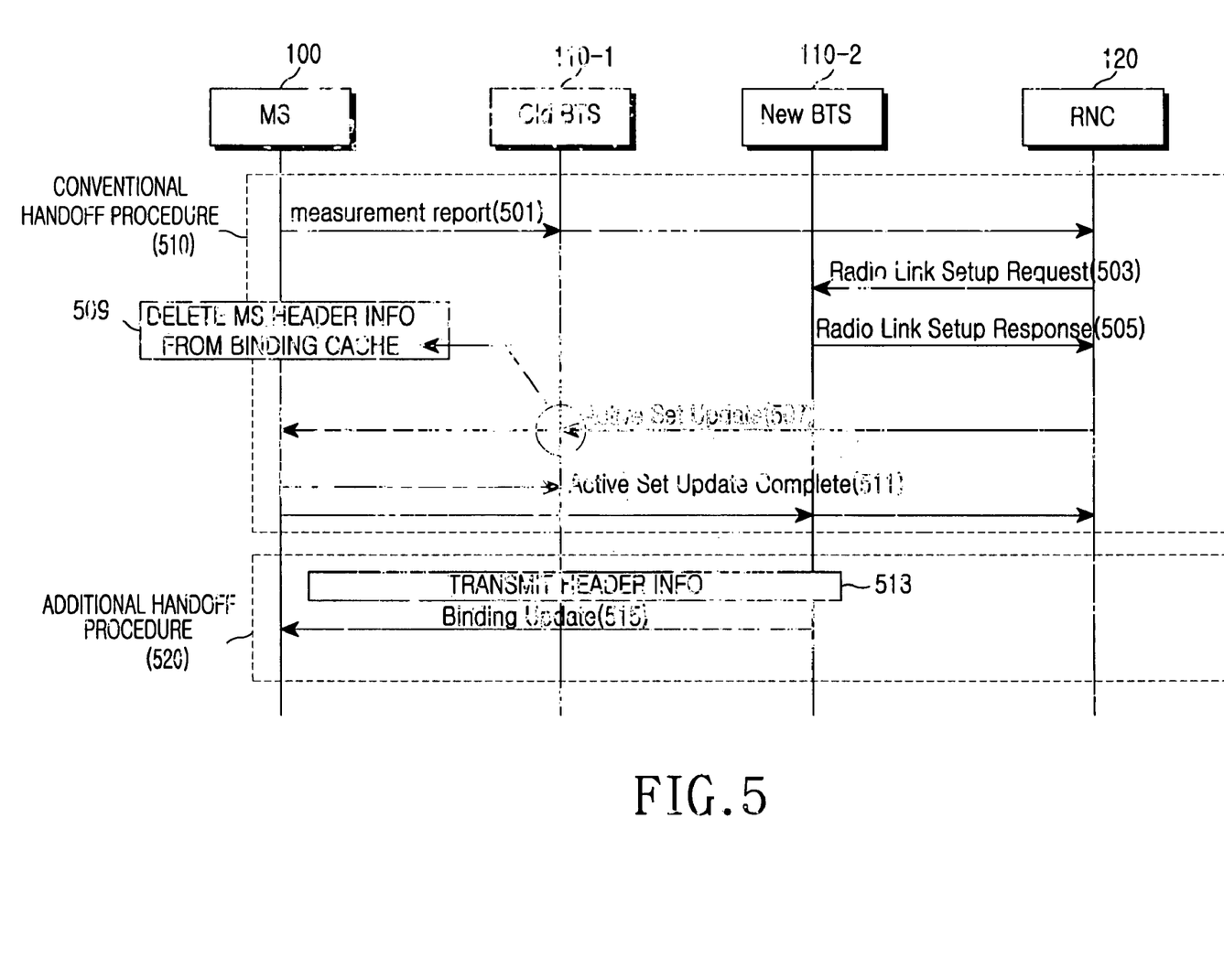
FIG. 5 illustrates a message flow between elements constituting an ALL-IP network according to a preferred embodiment of the present invention.

FIG. 5 illustrates a message flow between elements constituting the ALL-IP network during a handoff according to a preferred embodiment of the present invention. In FIG. 5, the MS 100 transmits measurement information to the old BTS 110-1 and the RNC 120 in step 501. The old BTS 110-1 and the RNC then start a soft handoff procedure using the measurement information. The RNC 120 transmits a Radio Link Setup Request message to the new BTS 110-2 in step 503. Upon receiving the Radio Link Setup Request message, the new BTS 110-2 transmits a Radio Link Setup Response message to the RNC 120 in step 505. The RNC 120, which has perceived that the radio link has been set up between the MS 100 and the new BTS 110-2 by receiving the Radio Link Response message from the new BTS 110-2, transmits an Active Set Update message to the old BTS 110-1 in step 507. Upon receiving the Active Set Update message, the old BTS 110-1 deletes the header information for the MS 100 stored in the header information storage 300-1 in step 509 and transmits the Active Set Update message to the MS 100. The MS 100 then transmits an Active Set Update Complete message to the old BTS 110-1 in step 511. Steps 501 to 511 indicated by a block 510 are a conventional handoff procedure.

In the handoff procedure according to the present invention, steps 513 and 515 indicated by a block 520 are added. In step 513, the MS 100 adds the traffic header information, which is temporarily stored therein to a message, for example, the Active Set Update message transmitted to the new BTS 110-2 and the RNC 120, and transmits the traffic header information added message to the new BTS 110-2. The additionally defined message has a message form as illustrated in Table 1.

TABLE 1

| | 7 | 6 | 5 | 4 | 3 | 2 | 1 | 0 |
|---|---|---|---|---|---|---|---|---|
| Existing Field | | | Active Set Update Field | | | | | |
| Added Field | | Type Version | | | | Extension Length Unused | | |
| | | | TOS (Type Of Service) | | | | | |
| | | | Protocol | | | | | |
| | | | Source Address (32 bits) | | | | | |
| | | | Destination Address (32 bits) | | | | | |
| | | Type | | | | Code | | |
| | | | MTU of next-hop network (16 bits) | | | | | |
| | Version | | | Unused | | | Payload Type | |

A field defined within the additionally defined message is shown in Table 2.

TABLE 2

Added Field:
Basic Field
   Type : Active Set Update Extension (message name is changeable)
   Extension Length : length of extension field of header
Traffic header information
   Use of a part of previously defined IP/UDP/RTP header information Upon receipt of the traffic header information transmitted from the MS 100, the new BTS 110-2 stores the traffic header information in the header information storage 300-2. The new BTS 110-2 then transmits a Binding Update message to the MS 100 in step 515.

The Binding Update message is defined as indicated in Table 3.

TABLE 3

| 7 | 6 | 5 | 4 | 3 | 2 | 1 | 0 |
|---|---|---|---|---|---|---|---|
| | | | Message Discriminator | | | | |
| | | | Message Type | | | | |
| | | | Transaction ID | | | | |

The field within the Binding Update message is illustrated in Table 4.

TABLE 4

Message Field
   Message Discriminator : protocol name
   Message Type : Binding Update
   Transaction ID : ID for identifying each call processing Upon receipt of the Binding Update message, the MS 100 removes the traffic header from the next generated data frame and transmits the header-removed data frame to the BTS 110-2.

Figure 6:
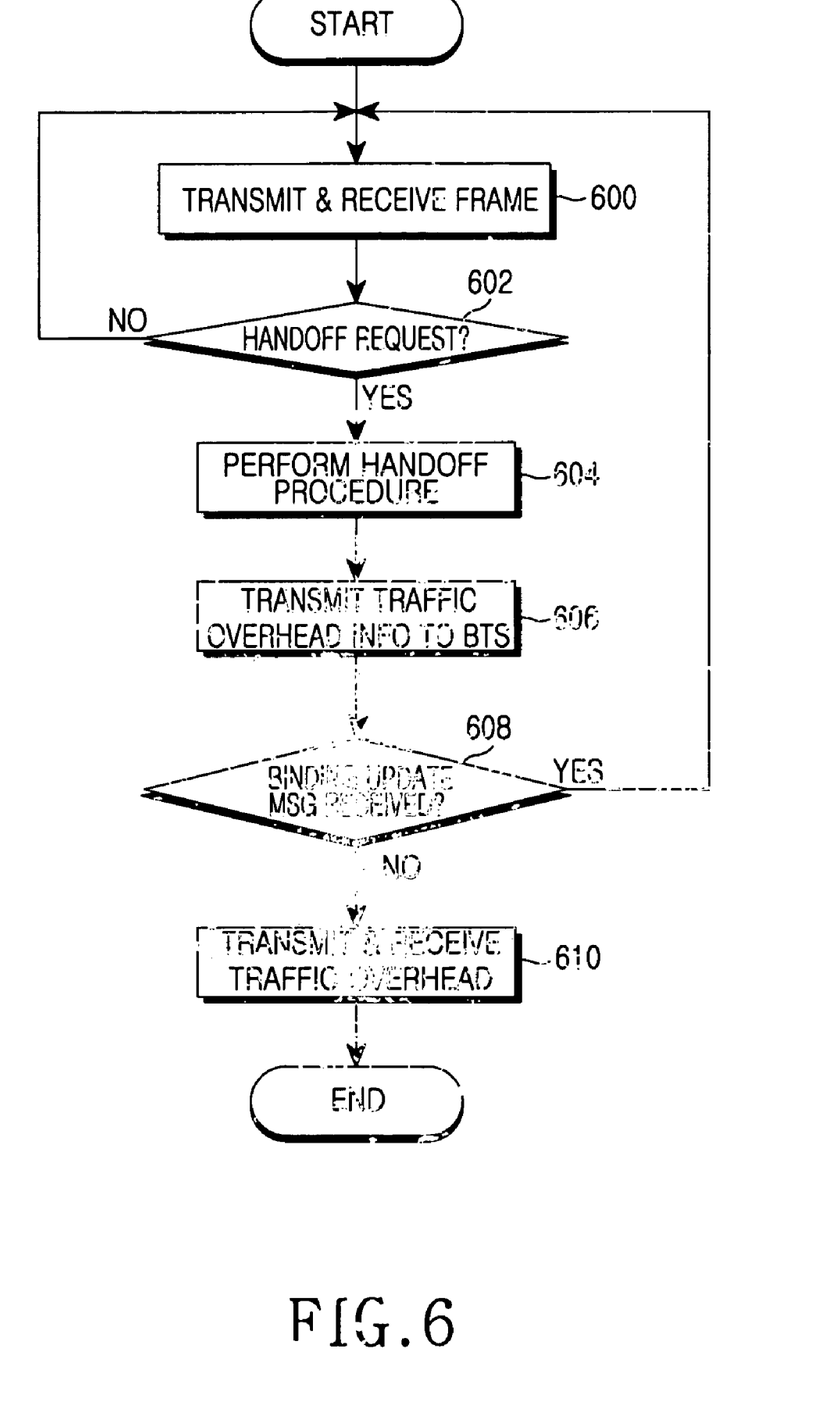
FIG. 6 is a flow chart illustrating a handoff operation by an MS according to a preferred embodiment of the present invention.

FIG. 6 illustrates a handoff operation by the MS according to a preferred embodiment of the present invention. Referring to FIG. 6, the MS 100 transmits and receives a frame to/from the old BTS 110-1 in step 600. The frame includes only the voice frame without an overhead. The MS 100 determines whether there is a handoff request in step 602. If a handoff request exists, the MS 100 starts to perform a handoff procedure in step 604. The MS 100 transmits the traffic overhead information to the new BTS 110-2 in step 606. The MS 100 determines whether the Binding Update message is received in step 608. If the Binding Update message is received, the MS 100 returns to step 600. If the Binding Update message is not received, the MS 100 transmits and receives the traffic overhead along with the voice frame in step 610.

Figure 7:
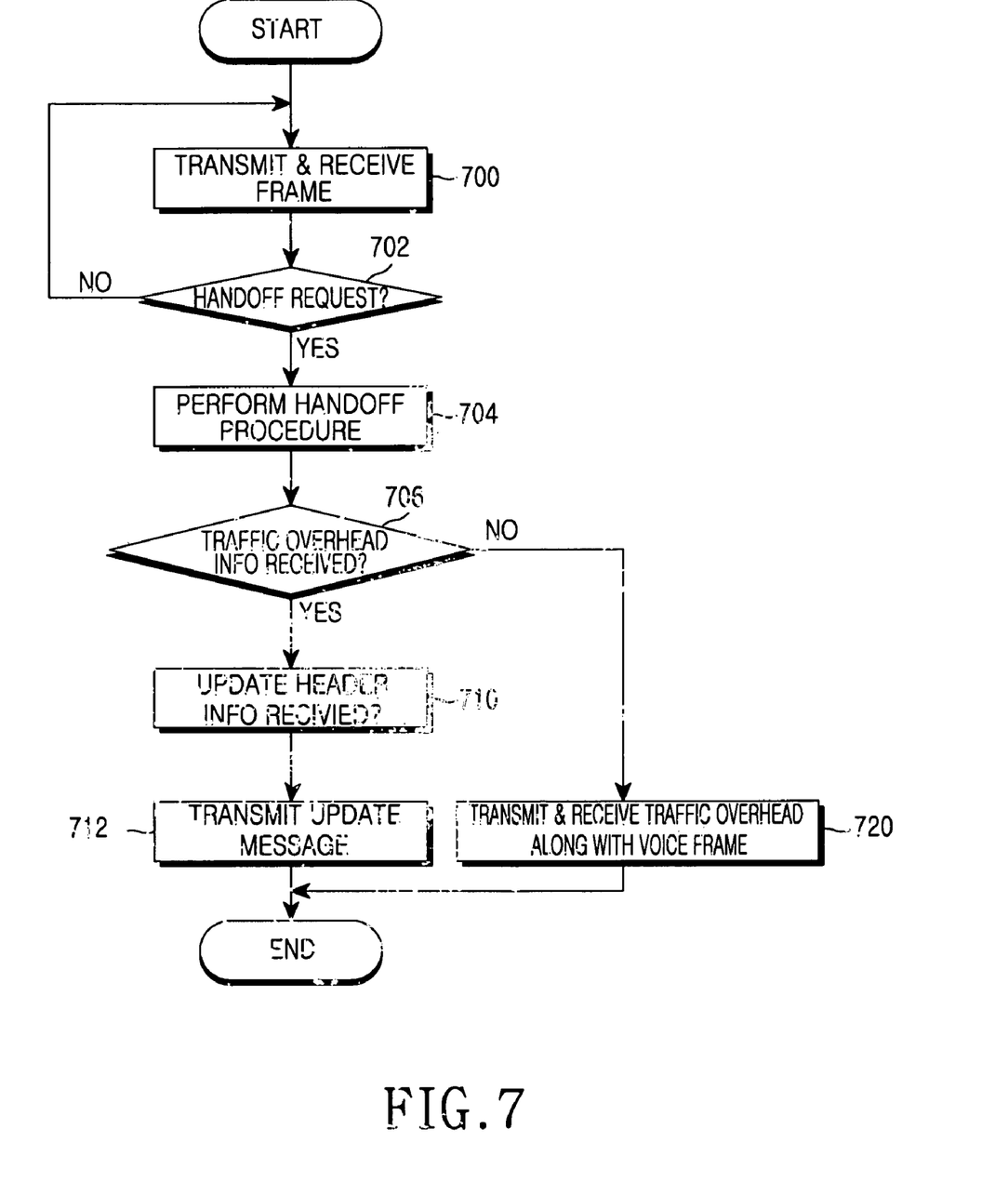
FIG. 7 is a flow chart illustrating a handoff operation by a BTS according to a preferred embodiment of the present invention.

FIG. 7 illustrates a handoff operation by the BTS according to a preferred embodiment of the present invention. The BTS 110 transmits and receives a frame to/from the MS 100 in step 700. The frame includes only the voice frame without an overhead. The BTS 110 determines whether there is a handoff request in step 702. If a handoff request exists, the BTS 110 starts to perform a handoff procedure in step 704. The BTS 110 determines whether the traffic overhead information is received in step 706. If the traffic overhead information is received, the BTS 110 updates the header information storage 300 in step 710 and transmits the Binding Update message to the MS 100 in step 712. If the traffic overhead information is not received, the BTS 110 transmits and receives the traffic overhead along with the voice frame in a conventional method in step 720.

As described above, addition of an excessive overhead to a voice frame, occurring in a radio region during handoff in the ALL-IP network can be prevented. Further, the inefficiency problem of bandwidths on a radio link occurring in various radio networks can be solved.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing a handoff in an ALL-IP network including at least one MS (Mobile Station) for transmitting a signaling frame including a header information and a voice frame to an old BTS (Base Transceiver System), which includes a header information storage for storing the header information for the MS in association with a unique code of the MS, and an RNC (Radio Network Controller), the method comprising the steps of:

transmitting measurement information to a new BTS and the RNC by the MS to start a handoff;

requesting, by the RNC the new BTS to set up a radio link with the MS that has transmitted the measurement information upon receipt of the measurement information by the RNC;

deleting the header information for the MS stored in the header information storage of the old BTS, by the RNC upon setup of the radio link between the MS and the new BTS;

transmitting a message including traffic header information including a part of defined internet protocol header information from the MS to the new BTS;

transmitting a binding update message from the new BTS to the MS upon receipt of the message including the traffic header information; and transmitting only the voice frame excluding the traffic header information from the MS to the new BTS; and transmitting by the MS the voice frame including the traffic header information when the binding update message is not received from the new BTS.

* * * * *